United States Patent
Yu et al.

(10) Patent No.: US 11,782,071 B2
(45) Date of Patent: Oct. 10, 2023

(54) OPTICAL-FIBER-ACCELERATION-SENSOR PROBE FOR SUPPRESSING RESONANCE AND OPTICAL FIBER MICROSEISMIC MONITORING SENSOR

(71) Applicant: Anhui University, Hefei (CN)

(72) Inventors: Benli Yu, Hefei (CN); Gang Zhang, Hefei (CN); Xuqiang Wu, Hefei (CN); Shili Li, Hefei (CN); Cheng Zuo, Hefei (CN)

(73) Assignee: Anhui University, Hefei (CN)

( * ) Notice: Subject to any disclaimer, the term of this patent is extended or adjusted under 35 U.S.C. 154(b) by 273 days.

(21) Appl. No.: 17/401,878

(22) Filed: Aug. 13, 2021

(65) Prior Publication Data

US 2022/0137087 A1 May 5, 2022

(30) Foreign Application Priority Data

Oct. 29, 2020 (CN) .......................... 202011179243.8

(51) Int. Cl.
*G01P 15/093* (2006.01)
*G01V 1/22* (2006.01)

(52) U.S. Cl.
CPC ............ *G01P 15/093* (2013.01); *G01V 1/226* (2013.01)

(58) Field of Classification Search
CPC ........ G01P 15/093; G01P 1/003; G01P 15/18; G01P 15/03; G01V 1/226; G01V 1/18; G01V 1/288; G01V 8/10; G01H 9/004
See application file for complete search history.

(56) References Cited

U.S. PATENT DOCUMENTS

| | | | | |
|---|---|---|---|---|
| 4,322,829 A * | 3/1982 | Davis, Jr. | ............... | G01V 1/181 385/12 |
| 4,534,222 A * | 8/1985 | Finch | .................... | G01P 15/093 356/477 |
| 4,893,930 A * | 1/1990 | Garrett | .................. | G01H 9/004 356/477 |
| 4,959,539 A * | 9/1990 | Hofler | .................... | G10K 13/00 250/227.19 |

(Continued)

FOREIGN PATENT DOCUMENTS

| AU | 2016223213 A1 * | 8/2017 | ............ | E21B 23/14 |
|---|---|---|---|---|
| CN | 209673840 U * | 11/2019 | ............ | G01P 15/093 |

*Primary Examiner* — Mohamed K Amara
(74) *Attorney, Agent, or Firm* — McDonnell Boehnen Hulbert & Berghoff LLP

(57) ABSTRACT

An optical-fiber-acceleration-sensor probe is provided, which includes a probe shell having a threaded hole at a bottom thereof and an optical-fiber entry and exit hole on a side thereof; a double-end stud in the probe shell, an end of the double-end stud being connected to the threaded hole; a high damping elastomer sleeved on the double-end stud; a mass block sleeved on the double-end stud and located on the high damping elastomer; an optical fiber interferometer located in the mass block and including a sensing arm and a reference arm, where the sensing arm is wound around the high damping elastomer, and the reference arm is wound around the mass block; high damping vibration absorbers on the mass block; and a nut located at another end of the double-end stud, and on the high damping vibration absorbers, where a washer is between the nut and the high damping vibration absorbers.

10 Claims, 3 Drawing Sheets

(56) References Cited

U.S. PATENT DOCUMENTS

| | | | | |
|---|---|---|---|---|
| 6,473,183 | B1* | 10/2002 | Tweedy | G01P 15/093 |
| | | | | 356/477 |
| 6,496,264 | B1* | 12/2002 | Goldner | G01H 9/004 |
| | | | | 73/514.01 |
| 6,650,418 | B2* | 11/2003 | Tweedy | G01V 1/181 |
| | | | | 356/477 |
| 7,137,299 | B2* | 11/2006 | Meyer | G01P 15/093 |
| | | | | 73/514.27 |
| 7,612,886 | B2* | 11/2009 | Guerineau | G01V 1/181 |
| | | | | 356/477 |
| 7,675,627 | B2* | 3/2010 | Tweedy | G01P 15/093 |
| | | | | 356/477 |
| 9,097,505 | B2* | 8/2015 | Andersen | G01D 5/35316 |
| 10,545,259 | B2* | 1/2020 | Guzman | G01P 21/00 |
| 2009/0323075 | A1* | 12/2009 | Brady | G01P 15/093 |
| | | | | 356/477 |
| 2017/0219348 | A1* | 8/2017 | Barone | G01B 5/24 |
| 2023/0105395 | A1* | 4/2023 | Giacomozzi | G01P 15/132 |
| | | | | 73/514.16 |

* cited by examiner

OPTICAL-FIBER-ACCELERATION-SENSOR PROBE FOR SUPPRESSING RESONANCE AND OPTICAL FIBER MICROSEISMIC MONITORING SENSOR

CROSS REFERENCE TO RELATED APPLICATION

This patent application claims the benefit and priority of Chinese Patent Application No. 202011179243.8 filed on Oct. 29, 2020, the disclosure of which is incorporated by reference herein in its entirety as part of the present application.

TECHNICAL FIELD

The present disclosure belongs to the field of optical fiber sensing, resonance suppression, and microseismic monitoring technologies, and particularly, relates to an optical-fiber-acceleration sensor probe for suppressing resonance and an optical fiber microseismic monitoring sensor.

BACKGROUND

Microseismic signals are generated due to the rock fracture that involves the whole process of crack initiation, crack propagation, and crack impregnation from the micro-scale fracture to the large-scale fracture. Thus, the rock fracture has important characteristics such as large magnitude range, wide vibration frequency. Since the 1960s, the microseismic monitoring technology has developed rapidly. Electrical-acceleration-sensor probes and microseismic monitoring sensors have been gradually applied at scale in the fields of mine earthquake, deep-buried tunnel rock burst warning, slope safety monitoring, coal and gas outburst warning, water inrush prediction, oil and gas exploration, and so on, and have achieved significant benefits in these fields. Since the electrical-acceleration-sensor probes operate based on the piezoelectric effect or the electromagnetic induction, the electrical-acceleration-sensor probes are not intrinsically safe and not suitable for the environments such as flammable and explosive environment, strong electromagnetic interference, as well as high temperature and high humidity, etc. Compared with electrical acceleration sensors, optical fiber acceleration sensors have the advantages of intrinsic safety, anti-electromagnetic interference, strong robustness, easiness in forming sensor arrays, and so on.

However, the current acceleration sensor probes and the corresponding microseismic monitoring sensors cannot simultaneously meet the requirement of monitoring wide-frequency-domain information from strong low-frequency microseismic signals to weak high-frequency microseismic signals. The acceleration sensitivity and the working frequency bandwidth are two core indicators of the optical fiber acceleration sensors, and are also mutually exclusive indicators of the optical fiber acceleration sensors. The resonance will seriously affect normal operation of the optical-fiber-acceleration-sensor probe, so that the demodulated microseismic signal is distorted near the resonant frequency, thereby producing distortion and affecting the working frequency bandwidth of the sensor. Therefore, a resonance suppression technology is very important. By means of controlling the damping of the probes, high sensitivity of the probes can be ensured, and meanwhile, the working frequency bandwidth of the probes can be broadened.

At present, the optical-fiber-acceleration-sensor probes mostly achieve the resonance suppression by injecting the silicone oil. However, in the above resonance suppression, the sealing requirement is high, the structure is complex, the sensitivity is still not high enough, and the working frequency bandwidth is also narrow. So, there provides an optical-fiber-acceleration-sensor probe for suppressing resonance and an optical fiber microseismic monitoring sensor (i.e., an optical fiber acceleration sensor) both having simple structures and low sealing requirements, so as to recover and obtain a microseismic signal with the highly accurate transient response, thereby realizing the accurate hypocenter location and the energy measurement, which is significant for the monitoring of wide-frequency-domain microseismic events.

SUMMARY

In order to solve the above-mentioned technical problems, the present disclosure provides a an optical-fiber-acceleration-sensor probe for suppressing resonance and an optical fiber microseismic monitoring sensor both having simple structures, low sealing requirements, and the high stability. The probe includes a probe shell, a double-head stud, a high damping elastomer, a mass block, an optical fiber interferometer, high damping vibration absorbers, a washer, and a nut that are assembled concentrically upwards in sequence. A sensing arm of the optical fiber interferometer is wound around the high damping elastomer, and a reference arm of the optical fiber interferometer is wound around the mass block.

The present disclosure provides an optical-fiber-acceleration-sensor probe for suppressing resonance, including: a probe shell provided with a threaded hole at a bottom thereof, and provided with an optical-fiber entry and exit hole on a side thereof; a double-end stud arranged in the probe shell, where an end of the double-end stud is connected to the threaded hole; a high damping elastomer sleeved on the double-end stud; a mass block sleeved on the double-end stud and located on the high damping elastomer; an optical fiber interferometer arranged in the mass block, and the optical fiber interferometer including a sensing arm and a reference arm, where the sensing arm is wound around the high damping elastomer, and the reference arm is wound around the mass block; high damping vibration absorbers located on the mass block; and a nut arranged on an other end of the double-end stud, and located on the high damping vibration absorbers, where a washer is arranged between the nut and the high damping vibration absorbers.

In one embodiment of the present disclosure, the high damping elastomer is a viscous elastomer, and is formed to be a hollow cylinder.

In one embodiment of the present disclosure, the high damping vibration absorbers are viscous elastomers, and are formed to be hollow rings.

In one embodiment of the present disclosure, the threaded hole is located in a central portion of the bottom of the probe shell; and the mass block is a hollow cylinder and provided with a groove in a side surface thereof.

In one embodiment of the present disclosure, the optical fiber interferometer is located in the groove; and the reference arm is wound around the groove.

In one embodiment of the present disclosure, the optical fiber interferometer further includes an optical fiber coupler, a first optical fiber Faraday rotator mirror, and a second optical fiber Faraday rotator mirror.

In one embodiment of the present disclosure, the optical fiber coupler is coupled to the second optical fiber Faraday rotator mirror through the reference arm, and the optical fiber coupler is coupled to the first optical fiber Faraday rotator mirror through the sensing arm.

In one embodiment of the present disclosure, the optical fiber coupler, the first optical fiber Faraday rotator mirror, and the second optical fiber Faraday rotator mirror are located in the groove.

In one embodiment of the present disclosure, the optical-fiber-acceleration-sensor probe for suppressing resonance further includes a shell top-cover that is fixedly arranged at a top of the probe shell.

The present disclosure further provides an optical fiber microseismic monitoring sensor, on which the optical-fiber-acceleration-sensor probe for suppressing resonance is applied. The optical fiber microseismic monitoring sensor includes: a light source provider configured for providing single wavelength laser; a light transmission assembly coupled to the light source provider, and configured for transmitting the laser emitted from the light source provider to other assemblies of the sensor; an optical-fiber-acceleration-sensor probe coupled to the light transmission assembly; and a microseismic signal demodulator coupled to the light transmission assembly, where the microseismic signal demodulator is configured for recovering and obtaining a microseismic signal from an interference light signal emitted from the probe. The optical-fiber-acceleration-sensor probe includes a probe shell provided with a threaded hole at a bottom thereof, the probe shell being provided with an optical-fiber entry and exit hole on a side thereof; a double-end stud arranged in the probe shell, wherein an end of the double-end stud is connected to the threaded hole; a high damping elastomer sleeved on the double-end stud; a mass block sleeved on the double-end stud and located on the high damping elastomer; an optical fiber interferometer arranged in the mass block, and the optical fiber interferometer comprising a sensing arm and a reference arm, wherein the sensing arm is wound around the high damping elastomer, and the reference arm is wound around the mass block; high damping vibration absorbers located on the mass block; and a nut arranged on an other end of the double-end stud, and located on the high damping vibration absorbers, wherein a washer is arranged between the nut and the high damping vibration absorbers.

The present disclosure provides an optical-fiber-acceleration-sensor probe for suppressing resonance, in which, the probe shell is provided; and the probe shell is formed with the threaded hole formed at the bottom thereof and is provided with the optical-fiber entry and exit hole on the side thereof; the end of the double-end stud is fixed to the threaded hole of the probe shell; the high damping elastomer is sleeved on the double-end stud and provided on the bottom of the probe shell; the mass block is located on the high damping elastomer; the optical fiber interferometer is arranged in the mass block; the sensing arm is wound around the high damping elastomer; the reference arm is wound around the mass block; the high damping vibration absorbers is located on the mass block; and the washer is placed on the high damping vibration absorbers, and fixed on the high damping vibration absorbers via the nut. In this way, the high damping elastomer, the mass block, the high damping vibration absorbers, and the washer are fixed between the bottom of the probe shell and the nut through the nut. The high damping elastomer in the present disclosure is also an energy transducer unit that converts an acceleration signal into a change signal of a length of winding the optical fiber; and the high damping elastomer is also a vibration absorbing unit that is matched with the high damping vibration absorbers to control the damping of the probe. The optical-fiber-acceleration-sensor probe for suppressing resonance in the present disclosure adopts two high damping vibration absorbers, to suppress the mechanical resonance. In addition, the energy transducer and the vibration absorbers are formed in an integrated manner, which simplifies the structure of the probe, has high sensitivity, and broadens working frequency band. The working frequency band may further be broaden by applying a fastening force through the nut, so as to meet the application requirements of different microseismic monitoring scenarios.

The optical fiber microseismic monitoring sensor in the present disclosure recovers and obtains a microseismic signal through a phase detection technology, which has the advantages of high sensitivity, intrinsically safe, anti-electromagnetic interference, strong robustness, large dynamic range, and the like. Thus, the optical fiber microseismic monitoring sensor is suitable for the microseismic monitoring of different rock-soil environments of soft rock, hard rock, and the like.

In the disclosure, the damping of the probe is optimized through a high damping material with low Young's modulus, and thus the resonance of the probe is suppressed, which obtains a flat frequency response curve and broadens the working frequency bandwidth while ensuring the high sensitivity. In this way, it is ensured to recover and obtain a microseismic signal with highly accurate transient response, and realize the accurate hypocenter location and the energy measurement, which is suitable for the monitoring and the warning of various types of mine dynamic disasters.

BRIEF DESCRIPTION OF THE DRAWINGS

To describe the technical solutions of the embodiments of the present disclosure more clearly, the following briefly describes the accompanying drawings required for describing the embodiments. Apparently, the accompanying drawings in the following description are merely some embodiments of the present disclosure, and those of ordinary skill in the art may still derive other drawings according to these accompanying drawings without creative efforts.

REFERENCE SIGNS IN DRAWINGS

| | |
|---|---|
| 10 probe shell | 503 first optical fiber Faraday rotator mirror |
| 20 double-end stud | 504 reference arm |
| 101 threaded hole | 505 second optical fiber Faraday rotator mirror |
| 102 shell top-cover | 60 high damping vibration absorber |
| 103 optical-fiber entry and exit hole | 701 nut |
| 301 high damping elastomer | 701 washer |
| 301 through hole | 100 light source provider |
| 40 mass block | 110 light transmission assembly |
| 401 through hole | 120 microseismic signal demodulator |
| 402 groove | 111 optical fiber for inputting laser |
| 50 optical fiber interferometer | 112 optical fiber circulator |
| 501 optical fiber coupler | 113 optical fiber for inputting/outputting laser |
| 502 sensing arm | 114 optical fiber for outputting signal laser |

DETAILED DESCRIPTION

Implementation manners of the present disclosure are described below through particular and specific examples. Other advantages and effects of the present disclosure can be easily understood by those skilled in the art from the content disclosed in the present specification. The present disclosure can also be implemented or applied by other additional different specific implementation manners. Various modifications or changes can also be made on various details in the present specification based on different views and applications without departing from the spirit of the present disclosure.

It is to be noted that the diagrams provided by the present embodiment only illustrate the basic concept of the present disclosure in a schematic way, so only the components related to the present disclosure are shown in the diagrams, instead of drawing according to the number, shape, and size of the components in the actual implementation. Any one of the type, number, and ratio of the components in the actual implementation can be changed at will, and the layout type of the components may be more complex.

Figures 1, 2:
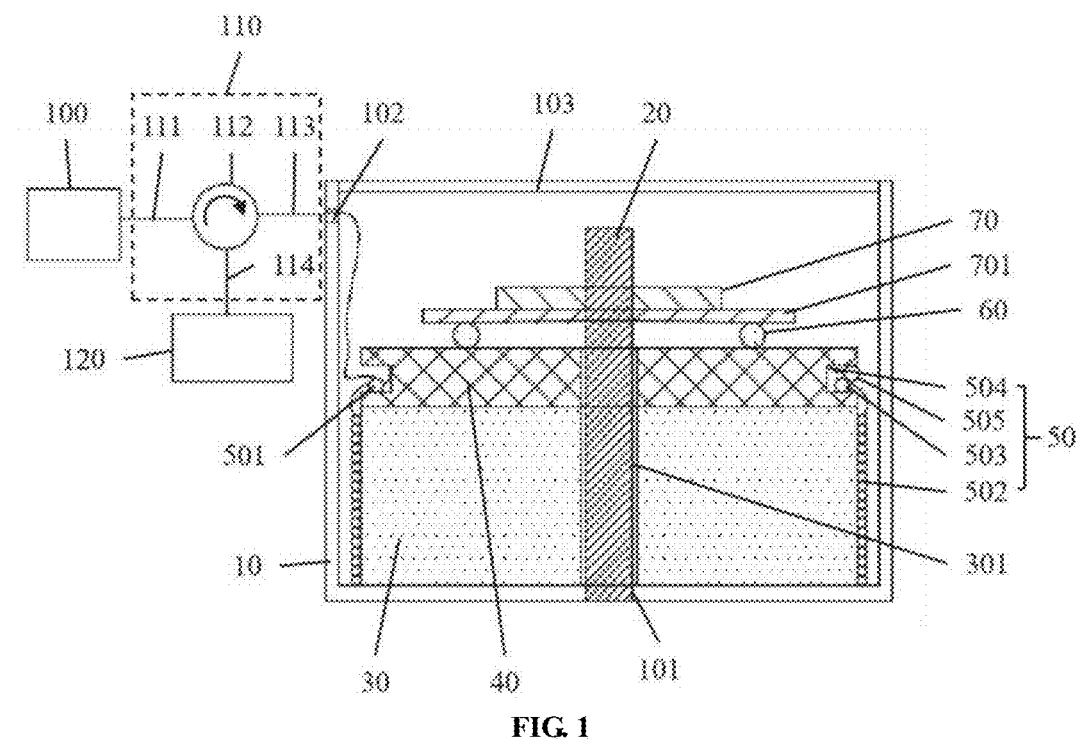
FIG. 1 is a schematic structural diagram of an optical-fiber-acceleration-sensor probe for suppressing resonance and an optical fiber microseismic monitoring sensor according to an embodiment of the present disclosure.
FIG. 2 is a schematic structural diagram of a high damping elastomer of the optical-fiber-acceleration-sensor probe for suppressing resonance according to an embodiment of the present disclosure.

To solve the problems that the sensitivity is still not high enough and the working frequency bandwidth is narrower of the optical-fiber-acceleration-sensor probe at present, an optical-fiber-acceleration-sensor probe for suppressing resonance is provided. As shown in FIG. 1, the probe includes: a probe shell 10, a double-end stud 20, a high damping elastomer 30, a mass block 40, an optical fiber interferometer 50, high damping vibration absorbers 60, and a nut 70.

As shown in FIG. 1, in the present embodiment, the probe includes the probe shell 10 and the double-end stud 20. The probe shell 10 is provided with an accommodating cavity. A threaded hole 101 is formed in the bottom of the probe shell 10. The threaded hole 101 is located in the central portion of the bottom of the probe shell 10. An end of the double-end stud 20 is connected to the threaded hole 101. In the present embodiment, a shell top-cover 102 is arranged at the top of the probe shell 10, and is fixedly connected to the probe shell 10. In the present embodiment, an optical-fiber entry and exit hole 103 is formed in a side of the probe shell 10, and the optical-fiber entry and exit hole 103 is close to the shell top-cover 102.

As shown in FIG. 1 and FIG. 2, in the present embodiment, the probe further includes the high damping elastomer 30. The high damping elastomer 30 is sleeved on the double-end stud 20, and is located at the bottom of the probe shell 10. In the present embodiment, the high damping elastomer 30 is, for example, formed to be a hollow cylinder. A circular through hole 301 is formed in the central portion. The through hole 301 is adapted to a diameter of the double-end stud 20, so that the high damping elastomer 30 can pass through the double-end stud 20 easily. In the present embodiment, the high damping elastomer 30 is, for example, a viscous elastomer. And the high damping elastomer 30 is, for example, selected from any one of rubber-plastic mixed materials, such as high damping isobutylene-isoprene rubber (IIR), doped rubber, and doped polyurethane/polyacrylate interpenetrating polymer network (PU/PACIPN). The high damping elastomer 30 has the characteristic of low Young's modulus, and can serve as both an energy transducer and a vibration absorber, which greatly improves the sensitivity of the probe, simplifies a probe structure, and facilitates the adjustment of the damping of the probe. In addition, the traditional solution of injecting the silicone oil is avoided, which greatly reduces the requirement on the sealing property.

Figure 3:
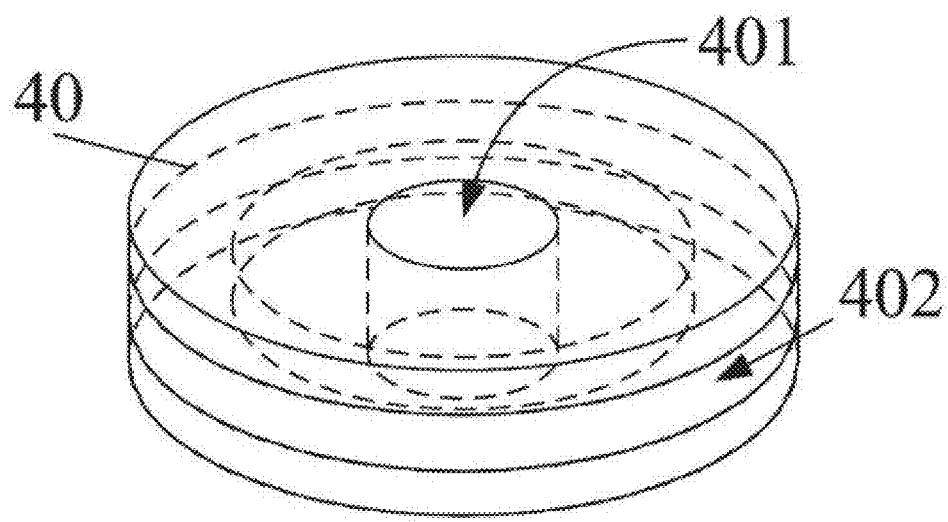
FIG. 3 is a schematic structural diagram of a mass block of the optical-fiber-acceleration-sensor probe for suppressing resonance according to an embodiment of the present disclosure.

As shown in FIG. 1 and FIG. 3, in the present embodiment, the probe further includes a mass block 40. The mass block 40 is sleeved on the double-end stud 20, and is located on the high damping elastomer 30. In the present embodiment, the mass block 40 is, for example, formed to be a cylinder. A circular through hole 401 is formed in the central position of the cylinder. The through hole 401 is adapted to the diameter of the double-end stud 20, so that the mass block 40 can pass through the double-end stud 20 easily. In the present embodiment, a groove 402 is formed in a side surface of the mass block 40. The groove 402 is configured for placing the optical fiber interferometer 50. In the present embodiment, the mass block 40 is made of one of copper, steel, and lead.

Figure 4:
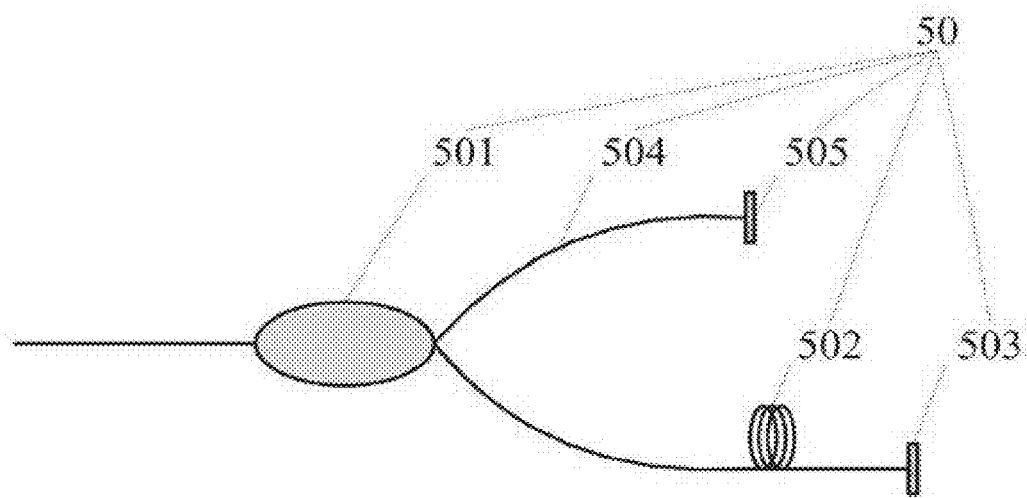
FIG. 4 is a schematic structural diagram of an optical fiber interferometer of the optical-fiber-acceleration-sensor probe for suppressing resonance according to an embodiment of the present disclosure.

As shown in FIG. 1 and FIG. 4, in the present embodiment, the probe further includes an optical fiber interferometer 50. The optical fiber interferometer 50 is arranged in the mass block 40. The optical fiber interferometer 50 includes a 3 dB optical fiber coupler 501, a sensing arm 502, a first optical fiber Faraday rotator mirror 503, a reference arm 504, and a second optical fiber Faraday rotator mirror 505. The 3 dB optical fiber coupler 501, the first optical fiber Faraday rotator mirror 503, and the second optical fiber Faraday rotator mirror 505 are located in the groove 402 of the mass block 40. The sensing arm 502 is wound around the high damping elastomer 30. The reference arm 504 is wound around the mass block 40. In the present embodiment, the optical fiber coupler 501 is connected to the second optical fiber Faraday rotator mirror 505 through the reference arm 504, and the optical fiber coupler 501 is connected to the first optical fiber Faraday rotator mirror 503 through the sensing arm 502. In present embodiment, the optical fiber coupler 501, the first optical fiber Faraday rotator mirror 503, and the second optical fiber Faraday rotator mirror 505 are located in the groove 402. The sensing arm 502 is wound around the high damping elastomer 30, and the reference arm 504 wound around the groove 402 of the mass block 40. In the present embodiment, the optical fiber interferometer 50 is, for example, one of an optical fiber Michelson interferometer and an optical fiber Mach-Zehnder interferometer. In the present embodiment, the optical fiber interferometer 50 is, for example, the optical fiber Michelson interferometer.

As shown in FIG. 1, in the present embodiment, the probe further includes high damping vibration absorbers 60 and a nut 70. The high damping vibration absorbers 60 are arranged in the probe shell 10, and are located on the mass block 40, i.e., the mass block 40 is located between the high damping elastomer 30 and the high damping vibration absorbers 60. In the present embodiment, the high damping vibration absorbers 60 are, for example, formed to be rings. The high damping vibration absorbers 60 are, for example, selected from high damping rubber rings, high damping alloy-spring washers, and foam metal rings. In the present embodiment, the high damping vibration absorbers 60 are non-liquid, which greatly reduces the sealing requirement of the probe. In the present embodiment, the high damping vibration absorbers 60 are placed on the mass block 40, the washer 701 is placed on the high damping vibration absorbers 60, and the nut 70 is performed the fixing. That is, the high damping elastomer 30, the mass block 40, the high damping vibration absorbers 60, and the washer 701 are fixed between the bottom of the probe shell 10 and the nut 70 through the nut 70. In addition, in the present embodiment, the thread glue is used for fixing permanently after the double-end stud 20 is fixed to the threaded hole 102 at the bottom of the probe shell 10 and the nut 70, so as to prevent the connection from loosening due to vibration.

According to the present disclosure, the optical-fiber-acceleration-sensor probe only monitors the acceleration signal in one direction. The same mechanisms can be arranged in other two perpendicular directions to realize the monitoring of the acceleration signals in three mutually perpendicular directions, and thus a three-axis optical-fiber-acceleration-sensor probe may be manufactured. That is, the optical-fiber-acceleration-sensor probes are respectively arranged in the three mutually perpendicular directions to realize the monitoring of the acceleration signals in the three mutually perpendicular directions.

As shown in FIG. 1, in a specific embodiment, the resonant frequency $f_0$ of the optical-fiber-acceleration-sensor probe for suppressing resonance is determined by:

$$\begin{cases} f_0 = \frac{1}{2\pi}\sqrt{\frac{K_{eff}}{M_{eff}}} \\ M_{eff} = m + \frac{m_{cly}}{3} \end{cases} \quad (1)$$

Where, $K_{eff}$ and $M_{eff}$ are respectively the equivalent stiffness coefficient and the equivalent mass of the optical-fiber-acceleration-sensor probe, m is the mass of the mass block, and $m_{cly}$ is the mass of the high damping elastomer.

The relationship between the acceleration sensitivity $S(f)$ and frequency f of the optical-fiber-acceleration-sensor probe for suppressing resonance can be expressed as:

$$S(f) = \frac{\partial \phi}{a_0}(f) = S_0 \frac{1}{\sqrt{\left[\left(\frac{f}{f_0}\right)^2 - 1\right]^2 + \xi^2\left(\frac{f}{f_0}\right)^2}} \quad (2)$$

$$\xi = \frac{R_1 + R_2}{\sqrt{K_{eff} M_{eff}}} \quad (3)$$

$$S_0 = \frac{8\pi^2 nbNvM_{eff}}{\lambda X H K_{eff}}\left\{1 - \frac{1}{2}n^2[(1-v_f)p_{12} - v_f p_{11}]\right\} \quad (4)$$

Where, $S_0$ and $\xi$ are respectively the static acceleration sensitivity and the damping coefficient of the optical-fiber-acceleration-sensor probe; $R_1$ and $R_2$ are the damping of the high damping elastomer and the damping of the high damping vibration absorber, respectively; $\lambda$ is the working wavelength of the laser; X is an influence coefficient of a winding optical fiber on an elastic reinforcement layer; n and $v_f$ are respectively the refractive index and the Poisson's ratio of an optical fiber; N is the number of turns of the winding optical fiber; v, b and H are respectively the Poisson's ratio, the outside radius, and the height of the high damping elastomer; and $p_{11}$ and $p_{12}$ are elasto-optic coefficients of the optical fiber, respectively.

Figure 5:
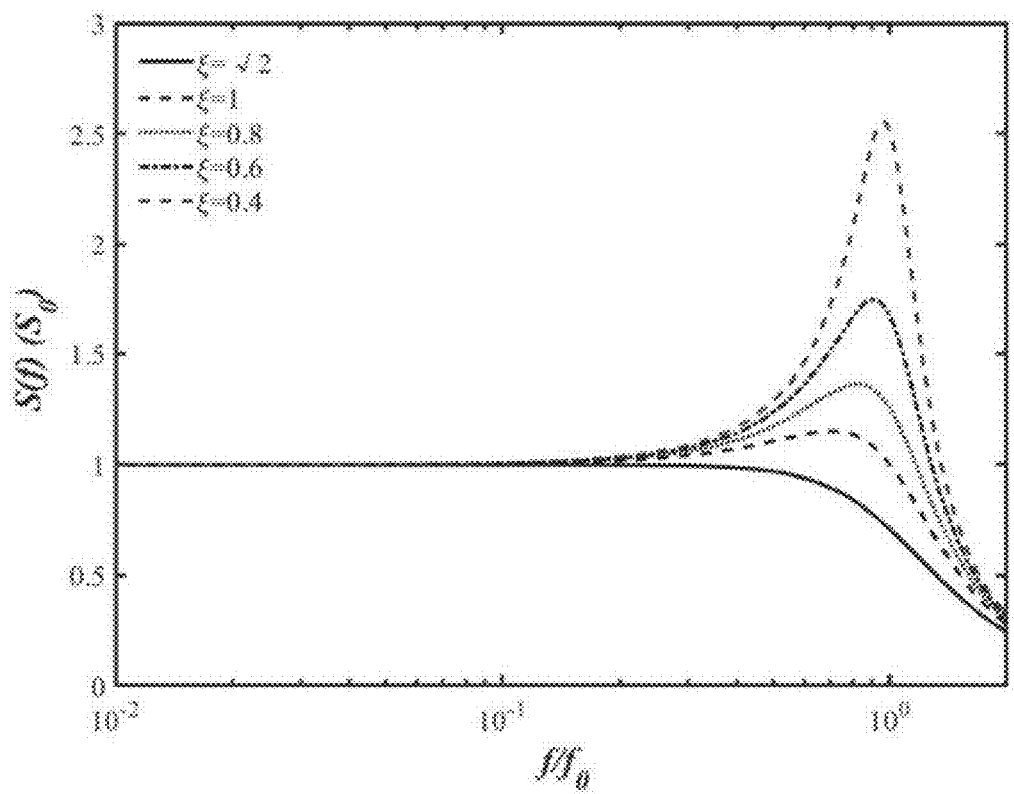
FIG. 5 shows simulated frequency response curves that the sensitivity of the optical-fiber-acceleration-sensor probe for suppressing resonance according to an embodiment of the present disclosure under different damping coefficients.

As shown in FIG. 5, in the present embodiment, in order to further illustrate the influence of damping on the frequency response of the probe, the acceleration sensitivity S(f) of the optical-fiber-acceleration-sensor probe is simulated in the scenarios where the value of the damping coefficient $\xi$ is $\sqrt{2}$, 1, 0.8, 0.6 and 0.4, so as to obtain frequency response curves. As shown in FIG. 5, when $\xi=1$, the resonance of the high-sensitivity optical-fiber-acceleration-sensor probe 100 is suppressed, and the sensitivity at the resonance peak is only 1.155 $S_0$, so that the working frequency bandwidth of the optical-fiber-acceleration-sensor probe can be effectively broadened.

Figure 6:
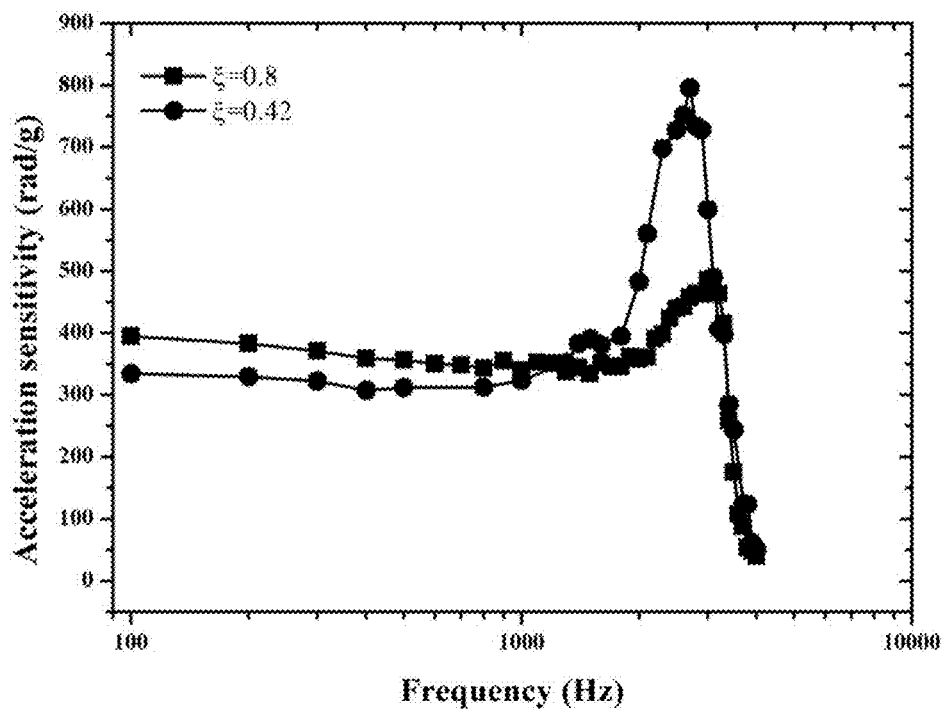
FIG. 6 shows actually measured frequency response curves of the optical-fiber-acceleration-sensor probe for suppressing resonance according to an embodiment of the present disclosure under the value of the damping coefficients that are 0.8 and 0.42 respectively.

As shown in FIG. 6, in the present embodiment, two optical-fiber-acceleration-sensor probes with different damping coefficients are actually measured. A horizontal coordinate represents the frequency of excitation acceleration, and a vertical coordinate represents the actually measured acceleration sensitivity. As shown in FIG. 6, when the value of the damping coefficient $\xi$ of the probe is 0.8, the value of the actually measured static sensitivity $S_0$ is 350 rad/g, the value of the sensitivity at the resonance peak is only 1.43 $S_0$, the value of the resonant frequency is 3000 Hz, and the ±3 dB working frequency bandwidth can be broadened to 3500 Hz. When the value of the damping coefficient $\xi$ of the probe is 0.42, the value of the actually measured static sensitivity $S_0$ is 325 rad/g, the value of the sensitivity at the resonance peak is 2.46 $S_0$, the value of the resonant frequency is 2700 Hz, and ±3 dB working frequency bandwidth is less than 2300 Hz. It can be known by comparing the actually measured frequency responses of the optical-fiber-acceleration-sensor probes with different damping coefficients that, the damping coefficients of the probe can be adjusted to be close to 1 by applying different high damping elastomers and different high damping vibration absorbers, so as to obtain the optical-fiber-acceleration-sensor probe for suppressing resonance.

As shown in FIG. 1, the present disclosure further provides an optical fiber microseismic monitoring sensor. The optical fiber microseismic monitoring sensor includes a light source provider 100, a light transmission assembly 110, the optical-fiber-acceleration-sensor probe, and a microseismic signal demodulator 120.

As shown in FIG. 1, the light source provider 100 is configured for outputting laser. The light source provider 100 is connected to the light transmission assembly 110. The light transmission assembly 110 is configured for transmitting the laser emitted from the light source provider to other assemblies of the sensor. The optical-fiber-acceleration-sensor probe is connected to the light transmission assembly 110. The microseismic signal demodulator 120 is connected to the light transmission assembly 110. The microseismic signal demodulator 120 is configured for recovering and obtaining a microseismic signal from an interference light signal emitted from the probe. The light source provider 100, the optical-fiber-acceleration-sensor probe, and the microseismic signal demodulator 120 are connected by the light transmission assembly 110. The structure of this optical-fiber-acceleration-sensor probe is the same as that of the optical-fiber-acceleration-sensor probe for suppressing resonance provided by the present disclosure, which is not described herein.

As shown in FIG. 1, in the present embodiment, the light transmission assembly 110 includes an optical fiber 111 for inputting laser, an optical fiber circulator 112, an optical fiber 113 for inputting/outputting laser, and an optical fiber 114 for outputting signal laser. The laser emitted from the light source provider 100 enters the microseismic signal demodulator 120 through the optical fiber 111 for inputting laser, the optical fiber circulator 112, the optical fiber 113 for inputting/outputting laser, the optical-fiber-acceleration-sensor probe, the optical fiber circulator 112, and the optical fiber 114 for outputting signal laser, so as to recover and obtain the microseismic signal. In the present embodiment, the optical fiber 113 for inputting/outputting laser extends into the probe shell 10 through the optical-fiber entry and exit hole 103 in the probe shell 10 and is connected to the optical fiber interferometer 50. In the present embodiment, the light source provider 100 adopts, for example, a single wavelength and narrow linewidth laser. The microseismic signal demodulator 120 adopts, for example, one of a phase generated carrier demodulation scheme and a heterodyne demodulation scheme. In the present embodiment, the microseismic signal demodulator 120 adopts, for example, the phase detection method.

The present disclosure provides the optical-fiber-acceleration-sensor probe for suppressing resonance, in which, the probe shell is provided; the probe shell is formed with the threaded hole formed at the bottom thereof and is provided with the optical-fiber entry and exit hole on the side thereof; the end of the double-end stud is fixed to the threaded hole of the probe shell; the high damping elastomer is sleeved on the double-end stud and provided on the bottom of the probe shell; the mass block is located on the high damping elastomer; the optical fiber interferometer is arranged in the mass block; the sensing arm is wound around the high damping elastomer; the reference arm is wound around the mass block; the high damping vibration absorbers is located on the mass block; and the washer is placed on the high damping vibration absorbers, and fixed on the high damping vibration absorbers via the nut. In this way, the high damping elastomer, the mass block, the high damping vibration absorbers, and the washer are fixed between the bottom of the probe shell and the nut through the nut. The high damping elastomer in the present disclosure is also an energy transducer unit that converts an acceleration signal into a change signal of a length of winding the optical fiber; and the high damping elastomer is also a vibration absorbing unit that is matched with the high damping vibration absorbers to control the damping of the probe. The optical-fiber-acceleration-sensor probe for suppressing resonance in the present disclosure adopts two high damping vibration absorbers, to suppress the mechanical resonance. In addition, the energy transducer and the vibration absorbers are formed in an integrated manner, which simplifies the structure of the probe, has high sensitivity, and broadens working frequency band. The working frequency band may further be broaden by applying a fastening force through the nut, so as to meet the application requirements of different microseismic monitoring scenarios.

The optical fiber microseismic monitoring sensor provided by the present disclosure recovers and obtains a microseismic signal through a phase detection technology, which has the advantages of high sensitivity, intrinsically safe, anti-electromagnetic interference, strong robustness, large dynamic range, and the like. Thus, the optical fiber microseismic monitoring sensor is suitable for the microseismic monitoring of different rock-soil environments of soft rock, hard rock, and the like.

In the disclosure, the damping of the probe is optimized through a high damping material with low Young's modulus, and thus the resonance of the probe is suppressed, which obtains a flat frequency response curve and broadens the working frequency bandwidth while ensuring the high sensitivity. In this way, it is ensured to recover and obtain a microseismic signal with highly accurate transient response, and realize the accurate hypocenter location and the energy measurement, which is suitable for the monitoring and the warning of various types of mine dynamic disasters.

In conclusion, the elastomer and the vibration absorbers of the optical-fiber-acceleration-sensor probe for suppressing resonance of the present disclosure are made of high damping material, which makes the damping coefficient of the probe close to 1, effectively suppresses the resonance of the probe, and broadens the working frequency bandwidth. Meanwhile, the high damping material has the characteristic of low Young's modulus, so the high damping elastomer can serve as both an energy transducer and a vibration absorber, which greatly improves the sensitivity of the probe. In addition, the traditional solution of injecting the silicone oil is avoided, which greatly reduces the requirement on the sealing property of the probe. The optical fiber microseismic monitoring sensor provided by the present disclosure picks up a microseismic signal by detecting the phase change of the laser, which has the advantages of high sensitivity, no charge at the front end of the optical fiber microseismic monitoring sensor, intrinsically safe, unti-electromagnetic interference, high temperature resistance, high pressure resistance, and the like. And thus, the optical fiber microseismic monitoring sensor is suitable for a variety of microseismic monitoring scenarios.

The above description is only the explanation to preferred embodiments of the present application and the used technical principle. Those skilled in the art should understand that the scope involved in the present application is not limited to the technical solution formed by a particular combination of the above-mentioned technical features, and should also cover other technical solutions formed by any combination of the above-mentioned technical features or their equivalent features, for example, the technical solutions formed by replacing the above-mentioned features with the technical features with similar functions disclosed by (but not limited to) the present disclosure, without departing from the concept of the present disclosure.

In addition to the technical features described in the specification, other technical features are known technologies of those skilled in the art, and are intended to highlight the innovative features of the present disclosure. The other technical features are not described in detail herein.

The invention claimed is:

1. An optical-fiber-acceleration-sensor probe for suppressing resonance, the optical-fiber-acceleration-sensor probe comprising:
   a probe shell provided with a threaded hole at a bottom thereof, and provided with an optical-fiber entry and exit hole on a side thereof;
   a double-end stud arranged in the probe shell, wherein an end of the double-end stud is connected to the threaded hole;
   a high damping elastomer sleeved on the double-end stud;

a mass block sleeved on the double-end stud and located on the high damping elastomer;

an optical fiber interferometer arranged in the mass block, and the optical fiber interferometer comprising a sensing arm and a reference arm, wherein the sensing arm is wound around the high damping elastomer, and the reference arm is wound around the mass block;

high damping vibration absorbers located on the mass block; and a nut arranged on an other end of the double-end stud, and located on the high damping vibration absorbers, wherein a washer is arranged between the nut and the high damping vibration absorbers.

2. The optical-fiber-acceleration sensor probe for suppressing resonance according to claim 1, wherein the high damping elastomer is a viscous elastomer, and is formed to be a hollow cylinder.

3. The optical-fiber-acceleration-sensor probe for suppressing resonance according to claim 1, wherein the high damping vibration absorbers are viscous elastomers, and are formed to be hollow rings.

4. The optical-fiber-acceleration-sensor probe for suppressing resonance according to claim 1, wherein the threaded hole is located in a central portion of the bottom of the probe shell; and the mass block is a hollow cylinder and provided with a groove in a side surface thereof.

5. The optical-fiber-acceleration-sensor probe for suppressing resonance according to claim 4, wherein the optical fiber interferometer is located in the groove; and the reference arm is wound around the groove.

6. The optical-fiber-acceleration-sensor probe for suppressing resonance according to claim 4, wherein the optical fiber interferometer further comprises an optical fiber coupler, a first optical fiber Faraday rotator mirror, and a second optical fiber Faraday rotator mirror.

7. The optical-fiber-acceleration-sensor probe for suppressing resonance according to claim 6, wherein the optical fiber coupler is coupled to the second optical fiber Faraday rotator mirror through the reference arm, and the optical fiber coupler is coupled to the first optical fiber Faraday rotator mirror through the sensing arm.

8. The optical-fiber-acceleration-sensor probe for suppressing resonance according to claim 6, wherein the optical fiber coupler, the first optical fiber Faraday rotator mirror, and the second optical fiber Faraday rotator mirror are located in the groove.

9. The optical-fiber-acceleration-sensor probe for suppressing resonance according to claim 1, further comprising a shell top-cover that is fixedly arranged at a top of the probe shell.

10. An optical fiber microseismic monitoring sensor, comprising:

a light source provider configured for providing single wavelength laser;

a light transmission assembly coupled to the light source provider, and configured for transmitting the laser emitted from the light source provider to other assemblies of the sensor;

an optical-fiber-acceleration-sensor probe coupled to the light transmission assembly, wherein the optical-fiber-acceleration-sensor probe comprises:

a probe shell provided with a threaded hole at a bottom thereof, the probe shell being provided with an optical-fiber entry and exit hole on a side thereof;

a double-end stud arranged in the probe shell, wherein an end of the double-end stud is connected to the threaded hole;

a high damping elastomer sleeved on the double-end stud;

a mass block sleeved on the double-end stud and located on the high damping elastomer;

an optical fiber interferometer arranged in the mass block, and the optical fiber interferometer comprising a sensing arm and a reference arm, wherein the sensing arm is wound around the high damping elastomer, and the reference arm is wound around the mass block;

high damping vibration absorbers located on the mass block; and a nut arranged on an other end of the double-end stud, and located on the high damping vibration absorbers, wherein a washer is arranged between the nut and the high damping vibration absorbers; and a microseismic signal demodulator coupled to the light transmission assembly, wherein the microseismic signal demodulator is configured for recovering and obtaining a microseismic signal from an interference light signal emitted from the probe.

* * * * *